US009557056B2

(12) United States Patent
Rumph

(10) Patent No.: US 9,557,056 B2
(45) Date of Patent: Jan. 31, 2017

(54) METHOD OF REMOVING AND DISPOSING OF WASTE FROM A REFINERY GROUND TANK INCLUDING MIXING AT LEAST ONE DILUENT WITH REDUCED-SIZE SOLIDS TO CAUSE A FLOWABLE MIXTURE

(71) Applicant: The Maitland Company, Sumter, SC (US)

(72) Inventor: Robert M. Rumph, Murrells Inlet, SC (US)

(73) Assignee: The Maitland Company, Sumter, SC (US)

( * ) Notice: Subject to any disclaimer, the term of this patent is extended or adjusted under 35 U.S.C. 154(b) by 0 days.

(21) Appl. No.: 14/966,024

(22) Filed: Dec. 11, 2015

(65) Prior Publication Data

US 2016/0097531 A1 Apr. 7, 2016

Related U.S. Application Data

(60) Continuation of application No. 14/520,306, filed on Oct. 21, 2014, now Pat. No. 9,259,698, which is a
(Continued)

(51) Int. Cl.
*B01F 7/00* (2006.01)
*B01F 3/12* (2006.01)
(Continued)

(52) U.S. Cl.
CPC ............... *F23G 5/033* (2013.01); *B01F 3/12* (2013.01); *B01F 3/1221* (2013.01); *B01F 7/002* (2013.01);
(Continued)

(58) Field of Classification Search
CPC ... B01F 3/1221; B01F 3/1271; B01F 7/00733; B01F 7/00741; B01F 7/1605; B01F 7/161; B01F 13/1041; B01F 2013/1077; B01F 2013/108; B01F 2013/1083; B01F 2013/1086; B01F 7/00666; B01F 7/169; B01F 13/004; B01F 15/0294; B01F 15/0229; B01F 15/00357; B01F 15/0292; B01F 13/0016; B01F 3/12; B01F 7/00008; B01F 15/0283; B01F 15/00006; B01F 7/00341; B01F 7/002; B01F 2215/0042; F23G 5/033; F23G 7/05; F23G 5/02; F23G 5/446; F23G 7/00; F23G 2900/70601; F23G 2201/701; B65G 67/04; B65G 67/24; B65G 67/20; B65G 67/02; B02C 23/20; B09B 3/0083; B09B 5/00; B60P 3/24
(Continued)

(56) References Cited

U.S. PATENT DOCUMENTS 1,652,960 A * 12/1927 Snelling ................. B65D 90/22
126/343.5 A
1,768,928 A * 7/1930 Peters ..................... B01F 7/161
366/197
(Continued)

FOREIGN PATENT DOCUMENTS

DE 4112511 10/1992
DE 4112511 A1 * 10/1992 .......... B01F 7/00733

OTHER PUBLICATIONS

Notice of Allowability mailed Mar. 10, 2014 in U.S. Appl. No. 14/155,159 (5 pgs.).

*Primary Examiner* — Charles Cooley
(74) *Attorney, Agent, or Firm* — Finnegan, Henderson, Farabow, Garrett & Dunner, LLP

(57) ABSTRACT

A method for disposing of solid refinery waste is disclosed. The method includes removing solid waste constituents from inside a refinery tank using excavating machinery, delumping the solid waste constituents, and conveying the
(Continued)

delumped solid waste constituents into a mobile tank. The method further includes transporting the delumped solid waste constituents in the mobile tank to a burning facility, adding at least one diluent, mixing, and pumping from the mobile tank a flowable mixture of refinery waste and the at least one diluent at the burning facility.

16 Claims, 10 Drawing Sheets

Related U.S. Application Data division of application No. 14/155,285, filed on Jan. 14, 2014, now Pat. No. 8,894,271.

(60) Provisional application No. 61/752,709, filed on Jan. 15, 2013.

(51) Int. Cl.

| | | |
|---|---|---|
| B02C 23/20 | (2006.01) | |
| F23G 5/033 | (2006.01) | |
| B65G 67/24 | (2006.01) | |
| B09B 3/00 | (2006.01) | |
| B65G 67/04 | (2006.01) | |
| B65G 67/20 | (2006.01) | |
| B01F 13/00 | (2006.01) | |
| B01F 7/16 | (2006.01) | |
| B01F 15/02 | (2006.01) | |
| B01F 15/00 | (2006.01) | |
| F23G 5/44 | (2006.01) | |
| F23G 7/00 | (2006.01) | |
| B60P 3/24 | (2006.01) | |
| B65G 67/02 | (2006.01) | |
| F23G 5/02 | (2006.01) | |
| F23G 7/05 | (2006.01) | |
| B08B 9/08 | (2006.01) | |
| B09B 5/00 | (2006.01) | |

(52) U.S. Cl.
CPC ....... *B01F 7/00008* (2013.01); *B01F 7/00341* (2013.01); *B01F 7/00666* (2013.01); *B01F 7/00733* (2013.01); *B01F 7/161* (2013.01); *B01F 7/1605* (2013.01); *B01F 7/169* (2013.01); *B01F 13/004* (2013.01); *B01F 13/0016* (2013.01); *B01F 15/00006* (2013.01); *B01F 15/00357* (2013.01); *B01F 15/0229* (2013.01); *B01F 15/0283* (2013.01); *B01F 15/0292* (2013.01); *B01F 15/0294* (2013.01); *B02C 23/20* (2013.01); *B08B 9/08* (2013.01); *B09B 3/0083* (2013.01); *B09B 5/00* (2013.01); *B60P 3/24* (2013.01); *B65G 67/02* (2013.01); *B65G 67/04* (2013.01); *B65G 67/20* (2013.01); *B65G 67/24* (2013.01); *F23G 5/02* (2013.01); *F23G 5/446* (2013.01); *F23G 7/00* (2013.01); *F23G 7/05* (2013.01); *B01F 2215/0042* (2013.01); *F23G 2201/701* (2013.01); *F23G 2900/70601* (2013.01)

(58) Field of Classification Search
USPC ....... 366/64–66, 96–99, 184, 186, 279, 261, 366/262, 263, 265, 270, 285, 286, 348, 366/608, 255–260, 197, 203, 207; 588/321
See application file for complete search history.

(56) References Cited

U.S. PATENT DOCUMENTS

| | | | | |
|---|---|---|---|---|
| 1,896,616 A * | 2/1933 | Gillican | ................ | B61D 5/008 105/358 |
| 1,915,757 A * | 6/1933 | Pierce | ................... | B61D 5/004 105/358 |
| 2,157,683 A * | 5/1939 | Voilrath | .............. | B01F 7/00558 209/280 |
| 2,625,720 A * | 1/1953 | Ross | ........................ | B41B 5/06 222/318 |
| 2,872,166 A * | 2/1959 | Roberts | .............. | B01F 13/0035 222/136 |
| 2,967,433 A * | 1/1961 | Phillips | ................... | B01F 7/161 248/586 |
| 3,180,628 A * | 4/1965 | Pullin | .................. | B28C 5/4286 298/22 R |
| 3,656,974 A * | 4/1972 | Mihalyi | ................... | A47J 43/04 366/285 |
| 3,905,725 A * | 9/1975 | Johnson | ................... | A01C 3/04 366/136 |
| 4,329,090 A * | 5/1982 | Teague | ................... | C09K 17/06 106/900 |
| 4,416,549 A * | 11/1983 | Kretschmer | ........... | A01C 3/026 366/190 |
| 4,444,508 A * | 4/1984 | Kreuer | ................... | B01F 13/06 366/139 |
| 4,572,675 A * | 2/1986 | Roberts | .............. | B01F 7/00741 366/263 |
| 4,577,805 A * | 3/1986 | Seymour | .............. | A23N 17/007 241/101.76 |
| 4,647,213 A * | 3/1987 | Hay, II | .............. | B01F 15/00922 222/108 |
| 4,661,046 A * | 4/1987 | Ruyle | .................... | A01C 3/026 406/116 |
| 4,685,868 A * | 8/1987 | Bodensteiner | ........... | F04F 1/00 366/270 |
| 4,751,887 A * | 6/1988 | Terry | ........................ | F23G 5/16 110/211 |
| 4,753,181 A * | 6/1988 | Sosnowski | .............. | F23G 5/006 110/234 |
| 4,836,687 A * | 6/1989 | Kardoes | .............. | B01F 7/00066 366/286 |
| 4,898,474 A * | 2/1990 | Lipson | .................... | B01F 7/161 366/199 |
| 5,040,900 A * | 8/1991 | Boggs | ....................... | B09B 1/00 366/343 |
| 5,044,761 A * | 9/1991 | Yuhki | ................ | B01D 19/0063 366/139 |
| 5,078,799 A * | 1/1992 | Matter | ................ | B01F 5/0218 134/167 R |
| 5,082,127 A * | 1/1992 | Huang | .................... | B66C 23/48 212/181 |
| 5,100,303 A * | 3/1992 | Depault | ................. | A01C 3/026 366/266 |
| 5,147,133 A * | 9/1992 | White | ................. | B01F 13/0035 134/166 R |
| 5,253,812 A * | 10/1993 | Staples | ................ | B08B 9/0933 241/21 |
| 5,269,603 A * | 12/1993 | Lisi | ..................... | B01F 7/00733 366/261 |
| 5,275,487 A * | 1/1994 | Rumph | ............... | B01F 7/00075 366/14 |
| 5,282,681 A * | 2/1994 | Supelak | .............. | B01F 7/00733 366/244 |
| 5,340,213 A * | 8/1994 | Rumph | ............... | B01F 7/00075 366/14 |
| 5,356,214 A * | 10/1994 | Styles | .................... | B01F 7/161 366/285 |
| 5,366,289 A * | 11/1994 | Supelak | .............. | B01F 7/00733 366/244 |
| 5,385,402 A * | 1/1995 | Rumph | ............... | B01F 7/00075 366/14 |
| 5,489,152 A * | 2/1996 | Rumph | ............... | B01F 7/00075 366/311 |

(56) References Cited

U.S. PATENT DOCUMENTS

| | | | | |
|---|---|---|---|---|
| 5,496,133 A * | 3/1996 | Sciarretti | E02D 19/10 | 166/241.7 |
| 5,507,572 A * | 4/1996 | Shields | B28C 5/4282 | 366/14 |
| 5,526,989 A * | 6/1996 | Staples | B08B 9/0933 | 134/23 |
| 5,603,568 A * | 2/1997 | Mobley | B01F 7/088 | 366/196 |
| 5,626,423 A * | 5/1997 | Rumph | B01F 7/1665 | 366/191 |
| 5,779,360 A * | 7/1998 | Tanaka | B01F 7/161 | 366/286 |
| 5,851,068 A * | 12/1998 | Rumph | B01F 13/0035 | 366/348 |
| 6,276,825 B2 * | 8/2001 | Running | | 137/268 |
| 6,276,826 B1 * | 8/2001 | Rumph | B01F 3/1221 | 366/270 |
| 6,293,693 B1 * | 9/2001 | Rodgers | B01F 3/10 | 366/189 |
| 6,333,446 B1 * | 12/2001 | Rumph | B01F 7/00075 | 366/331 |
| 6,412,974 B1 * | 7/2002 | Scholl | B01F 13/0035 | 366/191 |
| 6,443,613 B1 * | 9/2002 | Rumph | B01F 7/243 | 366/264 |
| 6,447,157 B1 * | 9/2002 | Running | B01F 3/1221 | 105/358 |
| 6,533,142 B1 * | 3/2003 | Hynick | B60P 3/2255 | 222/136 |
| 6,540,871 B1 * | 4/2003 | Rumph | D21C 11/0007 | 162/16 |
| 6,641,297 B2 * | 11/2003 | Rumph | B01F 7/00075 | 366/14 |
| 6,851,845 B2 * | 2/2005 | Rumph | B01F 7/04 | 366/142 |
| 6,964,511 B2 * | 11/2005 | Rumph | B01F 3/1221 | 366/261 |
| 7,607,819 B2 * | 10/2009 | Gaeta | B01J 19/006 | 366/182.4 |
| 7,685,896 B2 | 3/2010 | Haughton et al. | | |
| 8,061,888 B2 * | 11/2011 | Ji | B01F 7/00975 | 366/155.1 |
| 8,371,742 B2 * | 2/2013 | Doron | B60P 3/16 | 366/270 |
| 8,641,266 B2 * | 2/2014 | McIntire | B01F 3/1221 | 366/137 |
| 8,721,166 B1 * | 5/2014 | Rumph | B01F 3/12 | 366/285 |
| 8,894,271 B2 * | 11/2014 | Rumph | B01F 3/12 | 366/285 |
| 8,985,841 B2 * | 3/2015 | Rumph | B01F 3/12 | 366/191 |
| 8,985,842 B2 * | 3/2015 | Rumph | B01F 3/12 | 366/191 |
| 9,016,931 B2 * | 4/2015 | Rumph | B01F 7/00116 | 366/285 |
| 9,079,143 B2 * | 7/2015 | Rumph | B01F 3/12 | |
| 9,108,174 B2 * | 8/2015 | Rumph | B01F 3/12 | |
| 9,259,698 B2 * | 2/2016 | Rumph | B01F 15/0283 | |
| 9,259,699 B2 * | 2/2016 | Rumph | B01F 15/0283 | |
| 2001/0002182 A1 * | 5/2001 | Running | B01F 3/1221 | 366/247 |
| 2002/0062057 A1 * | 5/2002 | Rumph | B01F 7/00075 | 588/253 |
| 2002/0196703 A1 * | 12/2002 | Rumph | B01F 7/04 | 366/183.1 |
| 2003/0090956 A1 * | 5/2003 | Knight | B01F 3/0853 | 366/138 |
| 2003/0156492 A1 * | 8/2003 | Rumph | B01F 3/1221 | 366/270 |
| 2004/0010476 A1 * | 1/2004 | Rumph | G06Q 10/08 | 705/406 |
| 2004/0208079 A1 * | 10/2004 | Hein | B01F 9/02 | 366/6 |
| 2005/0207272 A1 * | 9/2005 | Morgenthaler | B01F 7/18 | 366/262 |
| 2005/0259511 A1 * | 11/2005 | Orton | B01F 13/002 | 366/285 |
| 2007/0000545 A1 * | 1/2007 | Cannon | B60P 1/58 | 137/560 |
| 2011/0205833 A1 | 8/2011 | Thuerwaechter | | |
| 2013/0003493 A1 * | 1/2013 | Payne | B01F 7/00058 | 366/286 |
| 2013/0170315 A1 * | 7/2013 | Martens | B01F 7/00733 | 366/242 |
| 2014/0133266 A1 * | 5/2014 | Rumph | B01F 7/00116 | 366/280 |
| 2014/0196640 A1 * | 7/2014 | Rumph | B01F 3/12 | 110/346 |
| 2014/0226431 A1 | 8/2014 | Rumph | | |
| 2014/0226432 A1 | 8/2014 | Rumph | | |
| 2015/0036456 A1 * | 2/2015 | Rumph | B01F 3/12 | 366/192 |
| 2015/0036457 A1 * | 2/2015 | Rumph | B01F 3/12 | 366/192 |
| 2015/0224458 A1 * | 8/2015 | Rumph | B01F 7/00116 | 366/289 |
| 2015/0352995 A1 * | 12/2015 | Rumph | B01F 3/12 | 366/153.3 |
| 2016/0097531 A1 * | 4/2016 | Rumph | B01F 3/12 | |

* cited by examiner

US 9,557,056 B2

METHOD OF REMOVING AND DISPOSING OF WASTE FROM A REFINERY GROUND TANK INCLUDING MIXING AT LEAST ONE DILUENT WITH REDUCED-SIZE SOLIDS TO CAUSE A FLOWABLE MIXTURE

CROSS-REFERENCE TO RELATED APPLICATION

The present application is a continuation of application Ser. No. 14/520,306, filed Oct. 21, 2014, now U.S. Pat. No. 9,259,698 B2, which is a divisional of application Ser. No. 14/155,285, filed Jan. 14, 2014, now U.S. Pat. No. 8,894,271, which claims the benefit of Provision Application No. 61/752,709, filed Jan. 15, 2013, the contents of each of which are incorporated herein by reference.

FIELD

Aspects of this disclosure involve a mixing apparatus for mixing a substance including solid constituents. Methods described in this disclosure can be used for cleaning ground tanks containing waste including solids on a tank bottom, and can further involve equipment and methods for disposing of the waste.

BACKGROUND

Residual wastes are often generated during industrial processes. In the context of oil refineries, the residual wastes may include byproducts of the refinement process. These wastes may be solids including, but not limited to, dirt, sand, grit, paraffin, wax, and/or emulsified oil. Solids accumulating inside of a ground tank settle on a tank bottom which, over time, may undermine the productivity of the tank. For example, a tank 120 feet in diameter with a height of 40 feet, may accumulate tens of feet of build up at the tank bottom, reducing its capacity and rendering it inefficient or unsuitable for use.

In the context of gasoline refineries, a catalyst is often used to start a reaction to initiate the processing of gasoline. Such catalysts may include an aluminum catalyst known as CC catalyst, or other precious-metal catalysts such as an FCC catalyst or palladium catalyst. When the catalyst is added, it can be in the form of a solid (e.g., a dry powder), which can later be extracted using one or more filters following the completion of the gasoline refinery process.

In some instances, a breach may occur in one of the pieces of equipment that allows catalyst to flow from a cat cracker during the processing. This flow is sometimes referred to as slop oil. When slop oil escapes and refineries try to process it, the slop oil may combine with the catalyst to form a thick layer of solids that settle onto the tank bottom. In certain scenarios, 60% to 70% of the solids at the bottom of a tank, such as, for example, a refinery tank, may comprise the slop layer. Other solids that rest on the tank bottom may include dirt, sand, grit, paraffin, wax, and emulsified oil. These solids may accumulate with time on the tank bottom and require cleaning.

Traditionally, in order to clean the refinery tanks, refineries pump liquids into the refinery tank, mix the liquids and solids, and extract a blend for centrifuging outside the refinery tank. The centrifuged mixture of solids and liquids are then transported from the location of centrifuging to an industrial burner (e.g., cement kiln) for disposal of the waste materials. These methods can be costly due to the costs associated with roll-off container rental, repair, and cleaning; shipping, storage, etc. Additionally, a considerable amount of resources are expended tracking the hazardous materials as they are extracted from the refinery tanks and loaded and unloaded at the centrifuge and the kiln.

Refinery tanks may remain in service or taken out of service as the waste is removed from the refinery tank. Where a slop layer is present, however, cleaning may be made difficult. Before the removal of any solids, the slop layer should be removed. This can take months, requiring the tank to be taken out of service, which can add expense. Accordingly, there is a need for an efficient process to remove, process, transport and dispose of the solids from a refinery tank.

SUMMARY OF A FEW EXEMPLARY EMBODIMENTS OF THE INVENTION

A method for disposing of solid refinery waste is disclosed. The method may include removing solid waste constituents from inside a refinery tank using excavating machinery, delumping the solid waste constituents, and conveying the delumped solid waste constituents into a mobile tank. The method may further include maintaining a head space between a top level of the delumped solid waste constituents in the mobile tank and a top wall of the mobile tank. The method may also include transporting the delumped solid waste constituents in the mobile tank to a burning facility, adding at least one diluent to the head space, mixing the at least one diluent with the delumped solid waste constituents using an agitator, and pumping from the mobile tank a flowable mixture of refinery waste and the at least one diluent at the burning facility.

In various embodiments, the method may include one or more additional features: the at least one diluent may be added to the head space after the delumped solid waste constituents were transported to the burning facility; the at least one diluent may be added to the head space before transporting the delumped solid waste constituents to the burning facility, and mixing the at least one diluent with the delumped solid waste constituents takes place, at least partially, during transporting the delumped solid waste constituents to the burning facility; delumping and conveying the solid waste constituents may be performed by one apparatus having a bin at a proximal end thereof, the bin feeding a delumping device, the delumping device depositing delumped solids on a conveyor, and a distal end of the conveyor being arranged to deposit delumped solid waste constituents into a manhole opening on top of the mobile tank; delumping the solid waste constituents may include forming a plurality of clumps weighing less than 20 lb; a length of the head space between the top level of the delumped solid waste constituents in the mobile tank and the top wall of the mobile tank may be larger than 12 inches; the method may further comprise measuring a mixing resistance of the agitator, and making a determination based on the mixing resistance of the agitator and initiating pumping only after a predetermined mixing resistance is achieved; the predetermined mixing resistance may correspond to when the mixture is substantially homogeneous and flowable; the mobile tank may be a pneumatic trailer that includes a plurality of individual compartments, each compartment having a fluid valve at a bottom, each fluid valve being sized to permit a mixture of solids and diluent to pass therethrough, and wherein mixing includes agitating the at least one diluent and the delumped solid waste constituents using an agitator inserted through a manhole opening on top of the pneumatic trailer; mixing may include agitating a central portion of an individual compartment to cause solids to flow by gravity down sloped floor walls of the pneumatic trailer; the conveyor may include a funnel configured for association with a manhole opening, for conveying the solid waste constituents to an individual compartment of the pneumatic trailer through a manhole opening; the method may further comprise separately mixing the at least one diluent and the delumped solid waste constituents in each of the plurality of individual compartments; the agitator may be configured for selective insertion into a manhole opening in a top of the pneumatic trailer, agitating may include moving at least a portion of the agitator vertically within the pneumatic trailer.

Other exemplary embodiments may include receiving a load of solid refinery waste in a mobile tank having at least one compartment with sloped floor walls, inserting an agitator into at least one opening on top of the mobile tank, mixing the at least one diluent with the solid refinery waste using the agitator to cause solids to move downward along the sloped floor walls of the at least one compartment of the mobile tank, and causing a substantially homogeneous flowable mixture of the at least one diluent and the solid refinery waste in the at least one compartment. The method may further include evacuating the flowable mixture from the at least one compartment via at least one fluid valve at the bottom of the at least one compartment.

In various embodiments, the method may include one or more additional features: the mobile tank may be a pneumatic trailer that includes a plurality of individual compartments separated by at least one buffer, and wherein the mobile tank includes a fluid valve at a bottom of each of the plurality of individual compartments, each fluid valve being sized to permit an emulsion of solids and diluents to pass therethrough in flowable form; moving the agitator vertically to facilitate mixing; the at least one compartment may include at least a first compartment and at least a second compartment, and wherein, mixing includes separately agitating each compartment.

A mixing apparatus for mixing refinery solid waste in a mobile tank having at least one compartment with sloped floor walls may be disclosed. The apparatus may include at least one agitator including an elongated shaft and at least one blade connected to the shaft. The apparatus may further include at least one external support configured for disposition adjacent a manhole opening in a top of the mobile tank, for supporting the at least one agitator when mixing the refinery solid waste in the mobile tank. The apparatus may also include at least one actuator connectable to the external support and operable for lifting and lowering at least a portion of the at least one agitator in the mobile tank to enable blending of solid and liquid constituents in the mobile tank.

In various embodiments, the apparatus may include one or more additional features: the agitator, the at least one external support, and the at least one actuator may be configured to cooperate in a manner enabling formation of a substantially homogeneous, flowable mixture in the mobile tank; the at least one agitator may be sized operate in a pneumatic tank having sloped floor sections, and to facilitate flow of the solid and liquid constituents down the sloped floor sections of the mobile tank; the apparatus may further include at least one valved opening at the bottom of the mobile tank; the at least one actuator may include at least one actuatable cylinder; the cylinder may be actuatable by fluid pressure; the fluid pressure may be air pressure; the at least one actuator may include a plurality of agitators and the at least one support includes a plurality of supports to enable simultaneous mixing of a plurality of individual compartments of the mobile tank; the apparatus may include at least one power supply for supplying power to the agitator, the power supply being configured to supply power to the agitator from a location at least 25 feet from the agitator; and the apparatus may further comprise at least one seal for connection to the manhole opening in a manner permitting the agitator to mix contents of the tank through the manhole while the seal substantially prevents gases from escaping from the mobile tank.

The foregoing are just a few examples of the invention. Additional aspects of inventive concepts and embodiments of the invention are set forth in part in the description which follows, and in part will be apparent from the description, or may be learned by practice of the invention. The objects and advantages of the invention will be realized and attained by the elements and combinations pointed out in the appended claims.

The accompanying drawings, which are incorporated in and constitute a part of this specification, illustrate one embodiment and together with the description, serve to explain various alternative principles of the invention.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Generally described, the present disclosure is directed to methods and equipment for cleaning ground tanks containing waste including solids on a tank bottom, and methods and equipment for waste disposal. As used herein and throughout the disclosure, the term "ground tank" may refer to any reservoir, mobile or stationary, that is typically maintained in a fixed location. The ground tank may be adapted to contain a substance used in a process of converting raw material into products of value (e.g., oil, gasoline, etc.), and may be, for example, a refinery tank. In certain embodiments, the substance may be hazardous and the ground tank may be sealed to prevent leakage of the hazardous materials. In some embodiments, the ground tank may be a stationary tank having a circular shape with a diameter between 50 and 300 feet. In one exemplary embodiment, the ground tank may be 120 feet in diameter and 40 feet in height. However, no particular shape, size or other dimension limits the claimed invention.

The ground tank may contain waste including solids on a tank bottom. As used herein and throughout the disclosure, the term "waste" may refer to any excess of an industrial process. In the context of oil refining, it may include byproducts of the refinement process. The waste may have a density higher than 9.5 lb per gallon, and may include solid constituents. Exemplary solid constituents that may be found on a tank bottom include dirt, sand, grit, paraffin, wax, emulsified, oil, etc. As used herein, the term "solids" is used broadly to include all sedimentary material having a viscosity greater than non-sedimentary material in the tank. The waste may accumulate inside the refinery tank over time, and may undermine the productivity of the tank. For example, a typical tank 120 feet in diameter and 40 feet tall may be completely out of capacity when the waste reaches a height of 30 feet. Even before then, additional build-up may result in diminished efficiency.

Figure 1:
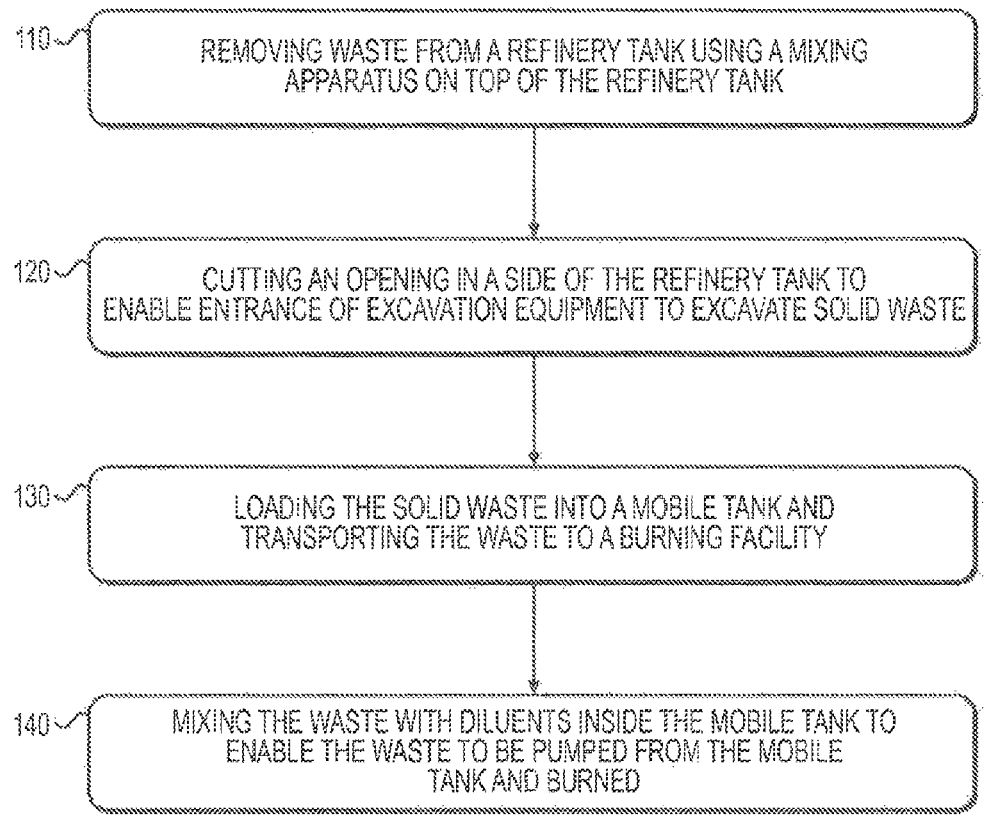
FIG. 1 is flow chart of a method for cleaning refinery tanks containing waste, and disposal of the waste, according to embodiments of the present disclosure.

FIG. 1 is an overview of an exemplary method of cleaning or emptying ground tanks containing waste, and disposing of the waste. In the figures and the embodiments discussed below, the ground tank is illustrated and described as a refinery tank, it should be understood, however, that the invention is not limited to a particular type of ground tank or a particular usage. In a first step (step 110), waste may be removed from a refinery tank using a mixing apparatus from a top of the refinery tank. The mixing apparatus may agitate an upper level of the waste into a pumpable form to enable the waste to be evacuated from the tank. A second step of the removal process (step 120), may include cutting an opening in a side of the refinery tank to enable entrance of excavation equipment such as, for example, a front end loader such as a Bobcat®, to excavate solid waste. The solid waste may be loaded onto a mobile tank and transported to a burning facility (step 130). As used herein and throughout the disclosure, the term "burning facility" may refer to a facilitate that provides incineration services, such as a cement kiln or a waste disposal site. Diluents may be added to the solid waste and may be mixed with the solid waste in the mobile tank, to facilitate removal of the solids from the tank, and to facilitate burning (step 140). It will be understood that certain embodiments may not require all of the steps described above, and in other embodiments, additional steps may be added.

Figure 2:
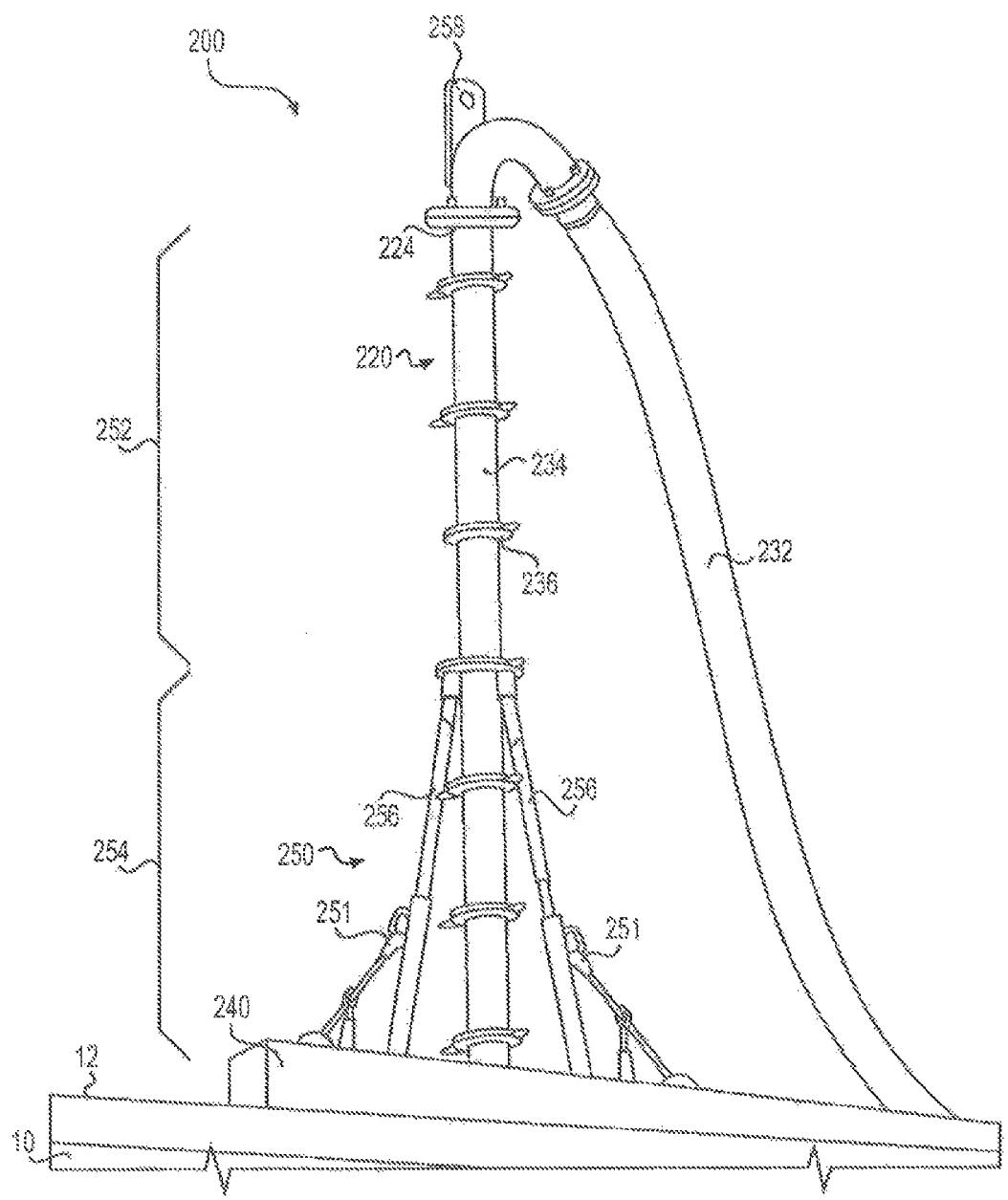
FIG. 2 is a top perspective view of a portion of a mixing apparatus, according to embodiments of the present disclosure.
Figure 3:
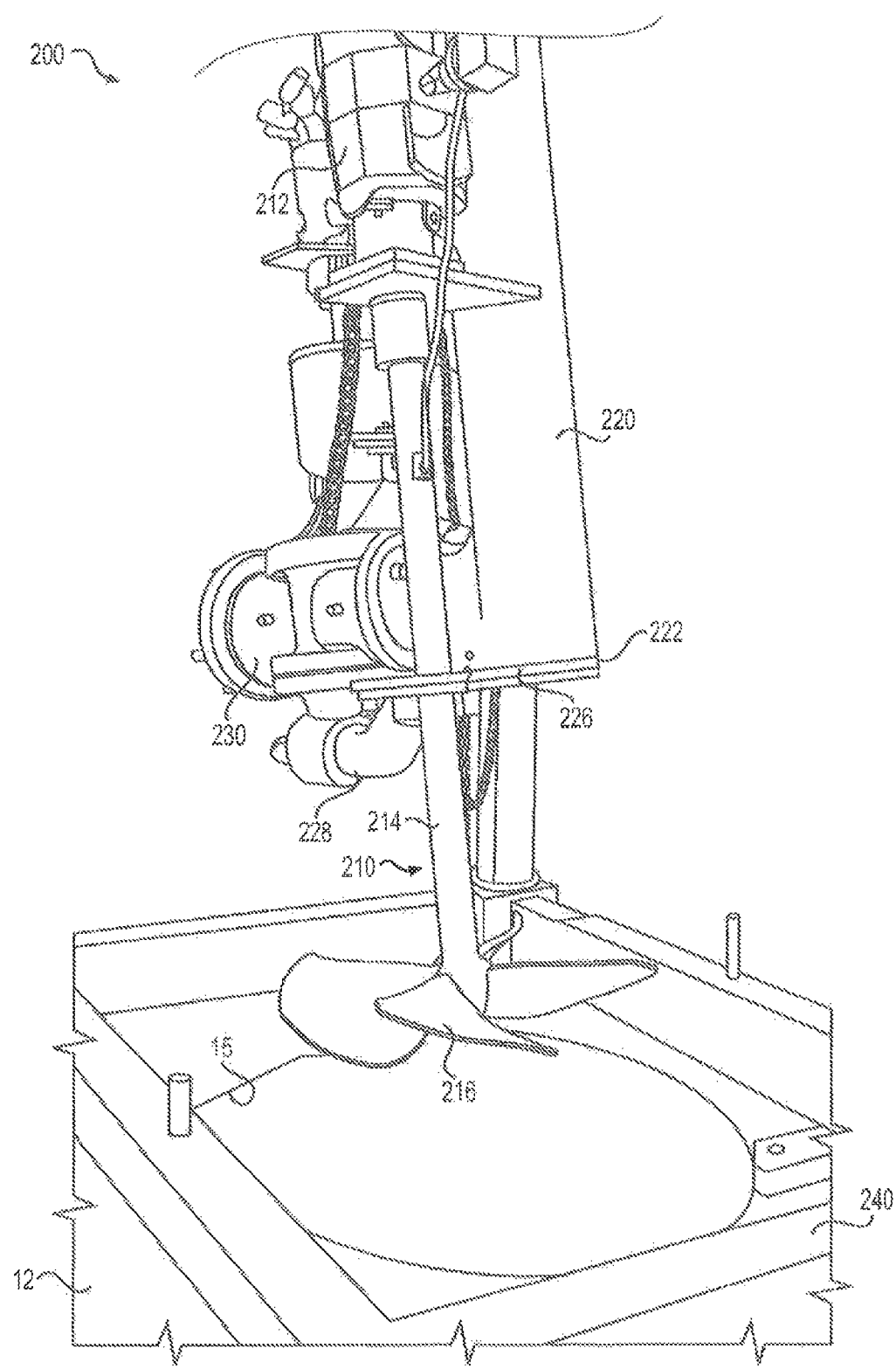
FIG. 3 is a bottom perspective view of a portion of a mixing apparatus, according to embodiments of the present disclosure.

FIGS. 2 and 3 illustrate an exemplary mixing apparatus 200 for mixing tank contents including solid waste or other sedimentary materials. As used herein the term "mixing apparatus" may refer to any device adapted or configured to agitate the contents of a refinery tank 10. The mixing apparatus may enable extraction of sedimentary materials during a first phase of the removal method, thereby freeing capacity within refinery tank 10. As used herein the term "sedimentary materials," may refer to solid constituents that settle to the bottom of a liquid. Using the method and equipment discussed below, waste levels may go from 30 feet or more to 3 feet or less within refinery tank 10, without taking refinery tank 10 out of service, although embodiments of the invention may include taking the refinery tank out of service during a waste removal process.

Mixing apparatus 200 may include an agitator 210 (FIG. 3). As used herein and throughout the disclosure, the term "agitator" may refer to any apparatus configured to stir a substance that includes liquid and solid constituents. Agitator 210 may be inserted through a first opening 15 of refinery tank 10 to enable mixing of tank contents. First opening 15 may be positioned on any surface of refinery tank 10. In the exemplary embodiment, first opening 15 may be formed on a top 12 of refinery tank 10. First opening 15 on top 12 of refinery tank 10 may be, for example, a manhole opening or any other opening in the tank wall. As used herein and throughout the disclosure, the term "manhole opening" and "opening" may refer to any aperture large enough to permit insertion of a mixing apparatus. The manhole opening may be cut specifically for use in removing waste from refinery tank 10 or may be part of refinery tank 10. Although only one opening on top 12 of refinery tank 10 is shown, it will be understood that additional openings on top 12 of refinery tank 10 may be provided.

In some embodiments, agitator 210 may be connected to a boom or support. As used herein and throughout the disclosure, the term "boom" may refer to any means to extend a reach of an agitator. By way of example only, the boom may be associated with a wheeled chassis and/or may be adapted to be connected to a vehicle. Agitator 210 may be supported by an elongated and expandable agitator support 220 (FIG. 2). As used herein and throughout the disclosure, the term "expandable agitator support" may refer to a support whose length can be altered. For example, expandable agitator support 220 may include a structure configured to hold agitator 210 during a mixing process and enable changing the depth of agitator 210 within refinery tank 10.

As shown in FIG. 3, agitator 210 may be connected to expandable agitator support 220 via a mount 226 located proximate a distal end 222 of expandable agitator support 220. Agitator 210 may include a first motor 212, a rotatable shaft 214, and at least one blade 216 connected to shaft 214. First motor 212 may be any known type of non-sparking motor including, for example, a hydraulic motor configured to rotate shaft 214. Agitator 210 may include any number of blades 216 in any construction or arrangement configured to mix the tank contents when shaft 214 is rotated. In some embodiments, agitator 210 may be a mono-spin mixer with a 300-600 horse power motor. The mono-spin mixer may be about 20 feet long and 8 feet high and 8 feet wide, having at least one blade between 15 to 25 inches. It will be understood that other agitators, including agitators with numerous other constructions and/or blade arrangements may be used.

Expandable agitator support 220 may be any known structure configured to hold or otherwise structurally support agitator 210 while agitator 210 operates within refinery tank 10. To this end, agitator support 220 may be an elongated and rigid support such as, for example, a solid rod or hollow tube. Expandable agitator support 220 may be made from materials known to one of ordinary skill in the art having sufficient durability to support agitator 210. Such materials may include, but are not limited to stainless steel, aluminum, other metals, and composites. It is contemplated that expandable agitator support 220 may be constructed from a single piece of material or may be made of multiple segments of either joined or un-joined material.

In an exemplary embodiment, expandable agitator support 220 may be formed of a plurality of detachable sections 234 (FIG. 2). Detachable section 234 may enable a length of expandable agitator support 220 to be selectively altered. In particular, by adding and/or subtracting detachable sections to or from support 220, the length of support 220 may be changed. In the exemplary embodiment, expandable agitator support 220 may be formed of at least seven detachable sections 234. It will be understood that a greater or lesser number of sections 234 may be provided. Each detachable section may be between 10-50 inches, and preferably about 25 inches.

Each detachable section 234 may include at least one flange 236. As used herein and throughout the disclosure, the term "flange" may refer to any connector. For example, flange 236 may be a protrusion on each detachable section 234, enabling adjacent sections to be connected to each other by bolting, fastening, or any other locking mechanism. In some embodiments, a flange 236 may be located on both ends of each detachable section 234. In an exemplary embodiment, a flange 236 may have a circular or semi-circular shape and may be located on both ends of each detachable section 234.

In some embodiments, expandable agitator support 220 may form a portion of a vacuum tube. As used herein and throughout the disclosure, the term "vacuum tube" may refer to a conduit configured to convey a substance, either by a pump (or other force applicator) on an upstream side of the flow or a downstream side of the flow. The vacuum tube may be constructed from a flexible hose, a rigid conduit, or from a combination thereof.

In some embodiments, expandable agitator support 220 may include the vacuum tube having a channel for removing material from the tank. For example, expandable agitator support 220 may have a tubular structure including a distal end opening (not shown) and a channel extending therethrough, thus forming the vacuum tube. Mount 226 may be configured to support the distal end opening of the vacuum tube proximate the agitator, such that when the agitator mixes material in refinery tank 10, the opening of the vacuum tube is positioned to draw material therethrough. The channel may be configured for evacuating material from refinery tank 10 through agitator support 220. In other embodiments, the channel may receive the vacuum tube. In those embodiments, the channel may have an inner diameter of, for example, 8 inches and the vacuum tube may have an inner diameter of, for example, 6 inches. The vacuum tube may extend through the channel and may be, for example, a rubber hose or a rubber tube.

In some embodiments, the vacuum tube may be coupled to at least one pump. The at least one pump may be, for example, a Viking gear pump. In other embodiments, the vacuum tube may be coupled to a plurality of pumps, e.g., two Viking gear pumps in series. In one example, the plurality of pumps may be connected to an outer pipe 232, extending from a proximal end 224 of expandable agitator support 220, and may provide suction for the removal of tank contents. In another embodiment, the plurality of pumps may be spread out along the vacuum tube. For example, a first pump may be configured for location inside refinery tank 10 and the second pump may be configured for location external to refinery tank 10. In this embodiment, a flexible tube may be used as a vacuum tube, and may define a flow path between the first pump ad the second pump.

In an exemplary embodiment, a pump 228 is positioned adjacent distal end 222 of support 220 to draw material from refinery tank 10 into the vacuum tube (FIG. 3). Pump 228 may be, for example, a Viking gear pump. One of ordinary skill in the art will recognize, however, that pump 228 may be any other known pump known configured to pump tank contents. Pump 228 may be supported by mount 226, and driven by a second motor 230. In particular, mount 226 may be configured to support agitator 212 and pump 228 adjacent each other proximate the distal end opening of the vacuum tube and in a manner such that when agitator 212 mixes contents in refinery tank 10, the contents may be withdrawn through the distal end opening of the vacuum tube via pump 228. Second motor 230 may be any known type of non-sparking motor including, for example, a hydraulic motor. The material in the vacuum tube may go through expandable agitator support 220 into outer pipe 232. An output end of the outer pipe 232 may be connected to a top of a tank trailer such as, for example, a Roberoller™ agitator tanker trailer, offered by Sumter Transport of Sumter, S.C.

In some embodiments, a frame 240 may be provided. Frame 240 may be configured for disposition adjacent first opening 15 in top 12 of refinery tank 10. As used herein and throughout the disclosure, the term "frame" refers to any structure for aiding in connection of a mixer structure to a tank opening. For example, frame 240 may be a unitary frame that partially or fully surrounds first opening 15. It is contemplated that frame 240 may be connected to refinery tank 10 by any known connector including, but not limited to, bolts, fastener, or any other locking mechanism.

In some embodiments, at least one actuatable connector 250 may be provided for interconnecting frame 240 to expandable agitator support 220 (FIG. 2). As used herein and throughout the disclosure, the term "actutable connector" may refer to any connector that may be used to adjust the length and/or position of an agitator support. In the exemplary embodiment, actuatable connector 250 may enable lifting of a first portion 252 of agitator support 220 above frame 240 while a second portion 254 of agitator support 220 below frame 240 is maintained in a substantially fixed position with respect to frame 240. In this manner, actuatable connector 250 may facilitate the formation of a gap between first portion 252 of agitator support 220 and a second portion 254 of agitator support 220. At least one detachable section 234 may be inserted into the gap. A first flange 236 (e.g., upper flange) on the inserted detachable section 236 may be connected to first portion 252 and a second flange 236 (e.g., lower flange) on the inserted detachable section may be connected to the second portion 254 when inserted in the gap. In this manner, the at least one actuatable connector 250 may enable the otherwise substantially rigid agitator support 220 to be elongated. In some embodiments, at least one actuatable connector 250 may be used to iteratively lower the agitator support 220 into refinery tank 10 as refinery tank 10 is emptied.

Actuatable connector 250 may include at least one lifting mechanism for selectively lifting first portion 252 in order to cause the gap. As used herein and throughout the disclosure, the term "lifting mechanism" may refer to any device capable of lifting and/or lowering an agitator support. In some embodiments, the lifting mechanism may include, for example, an actuator, such as one or more hydraulic cylinders.

In some embodiments, the lifting mechanism may operate in a first mode for lifting and lowering agitator support 220 when agitator support 220 is detached from frame 240, and may further operate in a second mode when agitator support 220 is affixed to frame 240 to enable selective insertion and removal of one or more detachable sections 234 from agitator support 220. In other embodiments, the lifting mechanism may selectively lift the first portion 252 of agitator support 220 in order to form a gap in the support structure, and lower first portion 252 when the at least one detachable section 234 is inserted and coupled to second portion 254.

In some embodiments, the lifting mechanism may include a chain, at least one hoist, a belt, a gear, a hydraulic cylinder, an air cylinder, a screw, or at least one pneumatic cylinder. In FIG. 2, two lifting mechanisms are provided. In the depicted embodiments, the two lifting mechanism are actuators e.g., pneumatic cylinders 256.

Actuatable connector 250 may also enable agitator support 220 to be attached or detached from frame 240. For example, actuatable connector 250 may include one or more connectors 251 such as, for example, hooks, fasteners, and/or bolts. Connectors 251 may be configured to secure agitator support 220 to frame 240 during the mixing process and detach agitator support 220 from frame 240 when it is desired to lower agitator 210.

Figure 4:
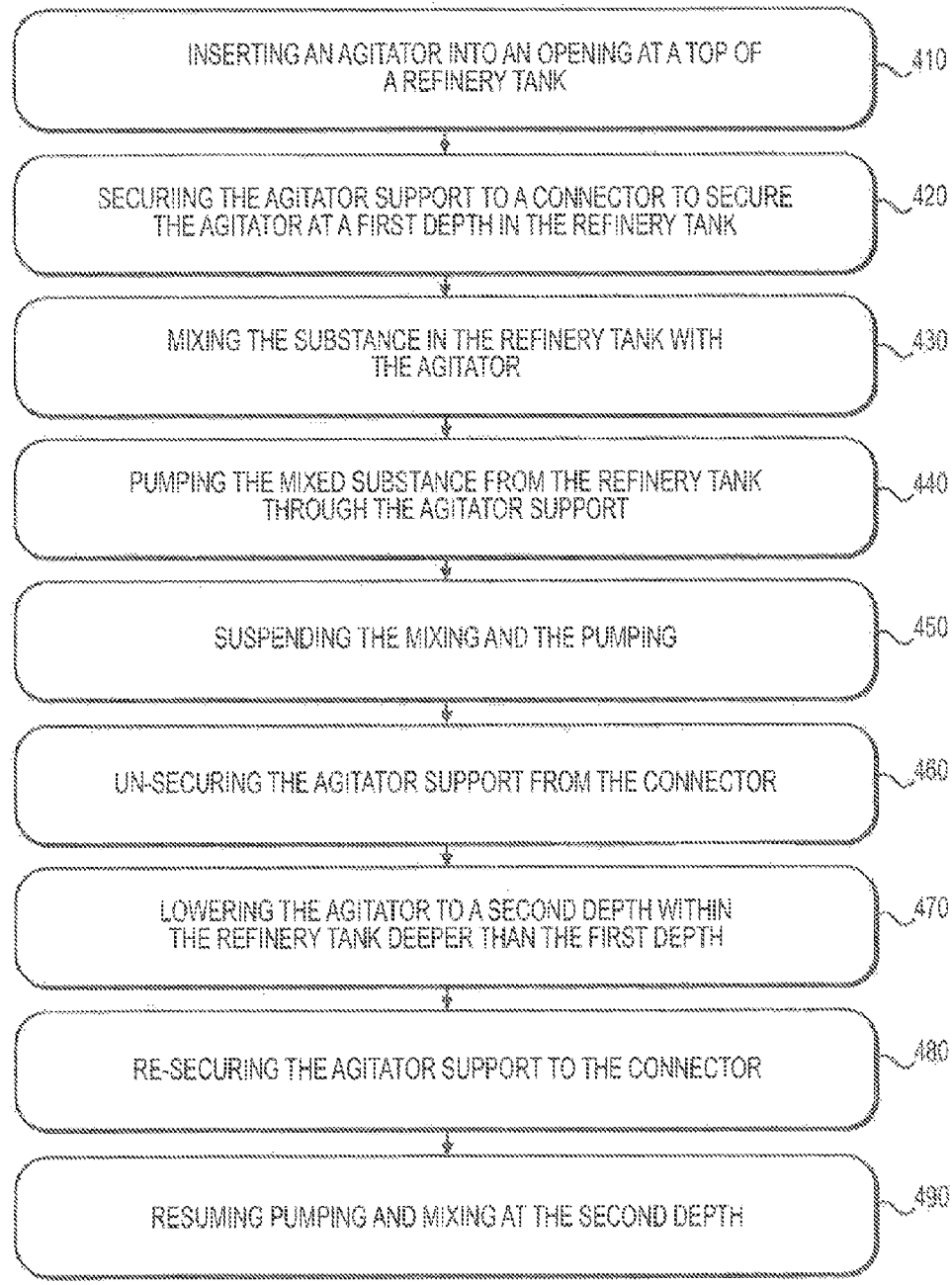
FIG. 4 is flow chart of a method for removing a substance from a refinery tank, according to embodiments of the present disclosure.

Referring to FIG. 4, a method for removing a substance from a refinery tank will now be discussed. A first step of the method may include inserting an agitator 210 into a first opening 15 on a top 12 of a refinery tank 10 (step 410). In some embodiments, the mixing apparatus 200 may include an agitator 210 connected to an elongated and expandable agitator support 220. Other mixing apparatuses, however, are contemplated.

In order to insert agitator 210 into tank 10, mixing apparatus 200 may be positioned above a top 12 of refinery tank 10 using a crane via a hook 258 (FIG. 2). Hook 258 may enable agitator 210 to be lowered by the crane, in order to position agitator 210 in first opening 15 on top 12 of refinery tank 10. Once agitator 210 is inserted into first opening 15 on top 12 of refinery tank 10, the next step may include securing expandable agitator support 220 to connector 251 located at a periphery of first opening 15 on top 12 of refinery tank 10 to secure agitator 210 at a first depth within refinery tank 10 (step 420 in FIG. 4). The first depth, i.e., the initial depth of agitator 210 may be determined based on measurements of the tank contents and a thickness level of the tank contents. For example, sampling devices may be used to determine the extent of solids in refinery tank 10, and the BTU level. Other measurements are contemplated.

Mixing of tank contents which may include a substance having liquid and solid constituents may then begin (step 430). Prior to mixing, however, excess liquid may be removed. In some embodiments, a portion of the liquid may be left within refinery tank 10 to be used as diluents in the mixing process. As used herein and throughout the disclosure, the term "diluent" may refer to any liquid added to the substance being mixed that is used to decrease the viscosity of the mixture. Examples of diluents may include, but are not limited to, water, naphtha, condensate, kerosene, and/or any other diluent known to one of ordinary skill in the art.

Upon mixing the substance, agitator 210 may create blended areas and/or pools within refinery tank 10. Each blended area may be, for example, about 15-35 feet in width and 5-15 feet in depth. It is contemplated that, in some embodiments, a plurality of agitators 210 may be used to form multiple blended areas within refinery tank 10. The blended areas may facilitate pumping of the materials from refinery tank 10.

In some embodiments, mixing apparatus 200 may include at least one pump for pumping the mixed substance from refinery tank 10 through agitator support 220 (step 440). In particular, the substance may be drawn through a vacuum tube, which may include expandable agitator support 220 and an outer pipe 232. In other embodiments, a plurality of pumps may be provided to create a flow path for drawing the substance from refinery tank 10. In particular, a first pump may be included to push the substance into an opening in expandable agitator support 220 and a second pump may be provided suction through the vacuum tube.

It is contemplated that, in some embodiments, the substance may be simultaneously mixed and pumped from refinery tank 10. In particular, mixing apparatus 200 may include a control configured to cause first motor 212 associated with agitator 210 and second motor 230 associated with first pump 228 to operate simultaneously. In other embodiments, first motor 212 and second motor 230 may operate independently of each other.

It is possible, while pumping the mixed substance from the tank, for the level of substance within the tank to drop below first pump 218. When this occurs, the mixing and pumping steps may be suspended (step 450), and agitator support 220 may be un-secured from frame 240 via connectors 251 (step 460). Actuatable connector 250 may then be used to lift a first portion 252 of agitator support 220 above frame 240 while a second portion 254 of agitator support 220 below frame 240 is maintained in a substantially fixed position with respect to frame 240 to form a gap therebetween. At least one detachable section 234 may then be inserted into the gap to elongate agitator support 220 and lower agitator 210 to a second depth within refinery tank 10 deeper than the first depth (step 470). Lowering agitator 210 may, in some embodiments, comprise energizing an actuator 256 or any other comparable method. After lowering the agitator to a second depth, agitator support 220 may be re-secured to frame 240 (step 480) to resume pumping and mixing at the second depth (step 490). It is contemplated that the method may include iteratively mixing, pumping, un-securing, lowering, re-securing, and resuming mixing a plurality of times and over a depth of at least 5 feet, at least 10 feet, at least 20 feet, at least 30 feet, or until refinery tank 10 is empty.

In some embodiments, the pumped substance may be conveyed to a mobile tank. For example, the pumped substance may be drawn through the vacuum tube directly into a mobile tank. The mobile tank may transport the substance to a burning facility. The mobile tank may, in certain embodiments, have an agitator built in and adapted to run during most of the transportation and prevent the solids from settling. In one example, the pumped substance may be loaded into a Roberoller™ agitator tanker trailer to be transported to a burning facility.

When a substance is no longer free to flow into any of the blended areas/pools or, in the alternative, when the rate of substance entering the blended areas/pools is lower than a predetermined threshold (e.g., 140 tons per day) such that the substance cannot be pumped from refinery tank 10 using the method described above, a second removal process may begin. During the second removal process, refinery tank 10 may be taken out of service (if it had been in service up to this point), and the solid waste may be excavated from refinery tank 10. The second removal process may also be used when a refinery tank is partially filled for easier access to the waste material. An exemplary method is illustrated in FIG. 5.

Figure 5:
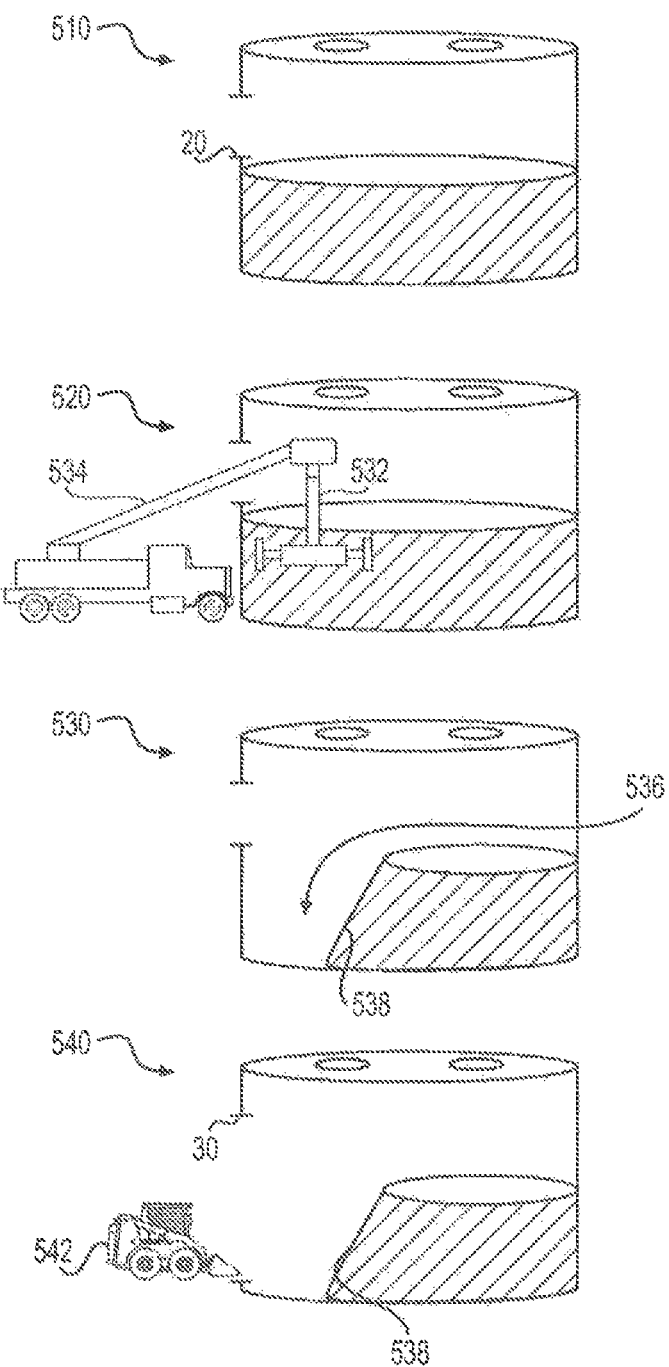
FIG. 5 depicts a method of evacuating a refinery tank containing waste, according to embodiments of the present disclosure.

Referring to FIG. 5, a first step of the method may involve cutting an opening 20 on a side of refinery tank 10 (step 510). The opening 20 may be the first opening formed on refinery tank 10, or may be the second opening formed on refinery tank 10, e.g., the opening may be formed on a side wall of refinery tank 10 after first opening on top 12 of refinery tank 10 has been formed. Opening 20 may be formed using known methods. In an exemplary embodiment, opening 20 may be formed using a pressure water jet cutting apparatus. This is only one example as any device capable of safely cutting opening 20 may be used.

Opening 20 may be formed on any portion of refinery tank 10. In certain embodiments, the opening 20 may be formed in a side wall of refinery tank 10 and at a height such that a bottom edge of the opening may be spaced from the tank bottom. In some embodiments, opening 20 may be spaced between 5 to 20 feet from the tank bottom. The opening may have any size, shape, and/or dimensions to enable insertion of a mixing apparatus (e.g., an agitator). For example, the dimensions of opening 20 may have a height between, for example, 2 and 10 feet and a width between, for example, 3 and 15 feet. In an exemplary embodiment, opening 20 may be 10×10 feet located about 8 feet from the tank bottom.

In some embodiments, the distance between a level of waste inside refinery tank 10 and a reference point may be measured to determine the dimensions of opening 20. In other embodiments, the waste may be sampled to determine the viscosity of the waste based on characteristics of the sample. If, for example, the sample contains a high liquid content, the liquids may be removed from tank 10. Additionally and/or alternatively mixing apparatus 200, discussed above, may be used to remove tank contents prior to forming opening 20.

After second tank opening 20 is created, an agitator 532 may be inserted through opening 20 (step 520). In some embodiments, agitator 210 may be a mono-spin mixer with a 300-600 horse power motor. The mono-spin mixer may be about 20 feet long and 8 feet high and 8 feet wide, having at least one blade between 15 to 25 inches. It will be understood that other agitators, including agitators with numerous other constructions and/or blade arrangements may be used.

In some embodiments, agitator 532 may be inserted into opening 20 using a boom 534. Boom 534 may be associated with, for example, a forklift to extend agitator 532 into and out of opening 20 and up and down within refinery tank 10. In certain additional embodiments, boom 534 may be configured to rotate agitator 532 about 360 degrees. Accordingly, agitator 532 may be inserted into refinery tank 10 and positioned adjacent the solid waste.

Agitator 532 may be configured to agitate the solid waste in a first area to cause the waste in the first area to have a first viscosity lower than a viscosity of waste in a second area at a periphery of or surrounding the first area. In some embodiments, diluents may be added to tank 10 during the mixing process. Examples of diluents may include, but is not limited to, water, naphtha, condensate, kerosene, and/or any other diluent known to one of ordinary skill in the art. By mixing the solid constituents in the first area with diluents, the viscosity of the first area may be lowered so that the solids may be removed via one or more pumps (not shown). This may result in the first area containing material that is more flowable than waste at a periphery of or surrounding the first area. As used herein, the word "periphery" includes any portion of any border, and the term "surrounding," includes complete or partial bounding of a first area.

It is contemplated that, in certain embodiments, agitator 532 may be a pivotal agitator having a pair of opposing thrust generators. In those embodiments, the pitch and angular orientation of agitator 532 may be altered during the mixing process. For example, agitator 532 may be inserted through opening 20 in a first position such that one of the thrust generators substantially faces a tank bottom. This position may be used to agitate and clear an area from the tank bottom. Additionally and/or alternatively, thrust generators may be moved to a second position generally parallel to the tank bottom. In this position, agitator 532 may be capable of mixing a larger area of waste.

The agitated waste may be removed from the first area while maintaining the waste of the second viscosity in the second area, thereby forming a safe room 536 in the refinery tank (step 530). For example, a flowable nature of waste of the first viscosity may be sufficient to enable that waste to be removed from the tank while a substantially non-flowable nature of the second viscosity may provide sufficient rigidity to the remaining waste to form a substantially non-flowable slope or wall, thereby creating a safe room within refinery tank 10. As used herein and throughout the disclosure, the term "safe room" refers to an area (e.g., a cavity) inside the tank without waste substance. The safe room 536 may define walls and a floor substantially coincident with the tank bottom. In some embodiments, the safe room 536 may be formed by removing a portion of the solid waste to form a cavity, where the waste substance itself forms some of the walls of the safe room. In alternative embodiments, one or more structures may be used to create safe room 536 or support at least one wall of safe room 536.

The dimensions of safe room 536 may depend on the type of substance in refinery tank 10. In some embodiments, safe room 530 may extend from an area adjacent the bottom edge of second tank opening 20 towards the tank bottom. According to one example, the safe room may be about 30 feet high and can have a circumference of about 90 feet.

It is contemplated that a method may include iteratively agitating and removing waste until the first area is expanded to a depth proximate the tank bottom. To do so, the method may include: pumping in diluents and mixing the waste in the first area; pumping waste out; moving the boom slightly to the right and pumping waste out again; moving the boom slightly to the left and pumping waste out again; pumping in diluents and further mixing; continuing to move the boom horizontally until the boom agitates the material to the right as far as possible, and to left as far as possible; and then continuing to repeat the above process more deeply into the refinery tank. This example procedure (pumping diluents in, mixing, and pumping waste out) may be repeated until the floor of the refinery tank is reached. After reaching the tank bottom, the boom may be used inside of refinery tank 10 to enlarge the cavity. In particular, the boom may be used to create safe room 536 that extends to tank bottom of refinery tank 10.

When working down all the way to the floor, a relatively steep slope 538 of the solid waste may be formed. The slope 538 may be between 30 degrees and 75 degrees from tank bottom to a back wall of refinery tank 10. In some embodiments, the slope 538 may be between 30 and 60 degrees. Once slope 538 of the solid waste is formed, it is possible to go inside refinery tank 10 and take samples of the solid waste in lower layers. The waste may be sampled to determine a minimum angle of repose of at least one wall of safe room 536 based on characteristics of the sample. This may be used to confirm that the materials inside tank 10 are not going to start moving and potentially collapse when the next steps take place.

Over the next step, opening 20 may be expanded toward the tank bottom to enable entry of a movable excavator 542 into safe room 536 of refinery tank 10 (step 540). In some embodiments, opening 20 may be iteratively expanded downward a location above the floor of the first area as the first area is being expanded. Opening 20 may be expanded until opening 20 has been expanded to a location above a floor of safe room 536. As used herein and throughout the disclosure, the term "excavator" may refer to any machinery adapted to move a substance from one location to another. Excavator 542 may be any excavator known to one of ordinary skill in the art. In some embodiments, excavator 542 may be a self-propelling excavator. Two non-limiting examples of excavator 542 include a Bobcat® skid-steer loader and a Caterpillar® mini wheel loader. Usually, there will be enough space for a Bobcat® to operate within the refinery tank since a typical refinery tank is 120-feet in diameter. The present method, however, can also be implemented with different-sized refinery tanks—for example, a 60-foot tank and a 240-foot tank.

The distance between the tank bottom to a bottom of the first area may be used as a reference to determine the dimensions of the expanded opening 30. In one example, the expanded opening 30 may have a maximum height of over six feet. In other embodiments, a second opening may be formed on the side of refinery tank 10 separate from the first opening that is formed on the side of refinery tank 10. In those embodiments, the combined height of the two openings may be over six feet. The expanded opening or second opening formed on the side of refinery tank 10 may be cut using, for example, a pressure water jet cutting apparatus. It will be understood that the expanded opening or second opening may be cut using any other known method.

In some embodiments, a bottom edge of the opening 30 may be spaced a number of feet from the tank bottom. For example, a bottom of the expanded second tank opening 30 may be distanced from the tank bottom by less than three feet. In such instances, a ramp may be built to enable excavator 542 to enter into refinery tank 10. The ramp (not shown) may be placed near the expanded opening 30 for excavator 542 to be propelled into safe room 536.

The excavator may be configured to remove waste of the second viscosity from the second area of refinery tank 10. While doing so, excavator 542 may maintain a predetermined slope of at least one wall of safe room 536. In particular, excavator 542 may maintain the predetermined slope of, for example, less than 90 degrees. By way of another example, the slope may be between 30 degrees and 75 degrees extending from the bottom of the floor to the back of refinery tank 10. By creating a safe area within the tank, excavator 542 may move from outside tank 10 to the floor of safe room 536. Within refinery tank 10, it is contemplated that excavator 542 may remove waste from one or more mounds and/or hills including the sloped walls of safe room 536. In those instances, excavator 542 may scape the hill down while keeping the angle of the hill. Excavator 542 may scape each of the walls of the safe room, forming piles of solid waste material.

In some embodiments, the solid waste material removed from refinery tank 10 may be transported to a burning facility to be disposed. To transport the material, the solid waste may be loaded into a tank. The tank may be mounted on a mobile vehicle such as, for example, a trailer, truck, rail car, ship, barge, or boat or otherwise configured to be transported. The mobile tank may include an agitator therein.

Figure 6:
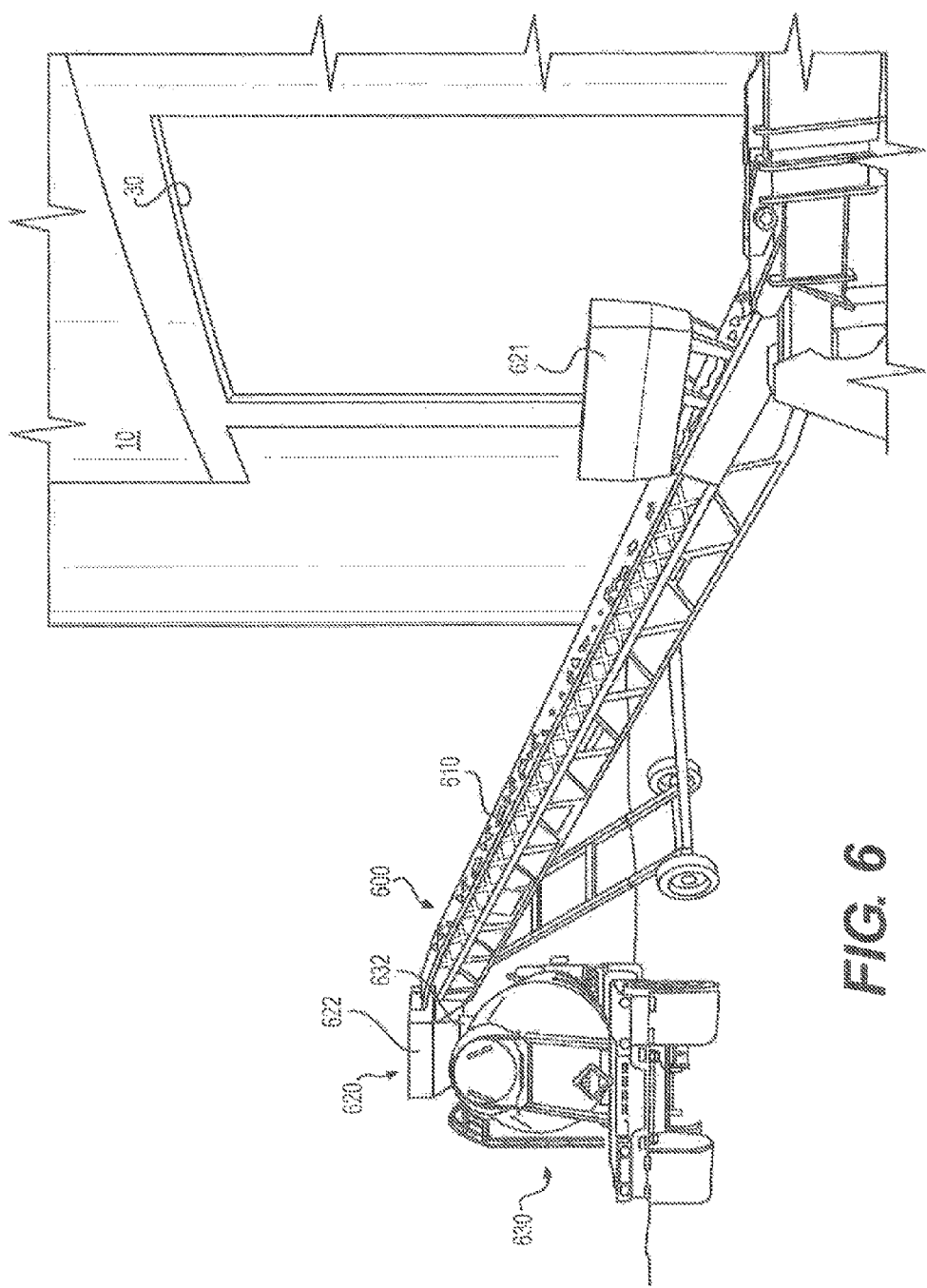
FIG. 6 is pictoral view of a conveyor apparatus at a refinery tank site conveying waste material from a refinery tank to a mobile tank, according to embodiments of the present disclosure.

In an exemplary embodiment shown in FIG. 6, the solid waste material may be loaded from refinery tank 10 into a mobile tank 630 using a conveying apparatus 600. Conveying apparatus 600 may be located adjacent the second expanded opening 30, with a portion of the apparatus extending above a manhole opening 632 on mobile tank 630. Material may be conveyed from second expanded opening 30 to manhole opening 632 to be loaded into mobile tank 630. It is contemplated that, in some embodiments, one or more connectors may be provided to secure conveying apparatus 600 to tank 630.

Conveying apparatus 600 may be an assembly of components including a conveyor 610 and at least one hopper 620, 621, at least one of which contains a delumper. The term "conveyor" as used herein and throughout the disclosure may refer to any know structure configured to convey a substance from a first location to a second location. For example, conveyor 610 may be a belt conveyor, a vibrating conveyor, a flexible conveyor, or any other known conveyor. In some embodiments, conveyor 610 may be associated with a mobile vehicle (e.g., a trailer or truck) or a stationary system. In an exemplary embodiment, conveyor 610 may be a mobile belt conveyor. In additional and/or alternative embodiments, conveyor 610 may include one or more actuators to adjust the height of at least a portion of conveyor 610 to facilitate the conveyance of the waste material.

As used herein and throughout the disclosure, the term "delumping" and "delumper" refers to processes and structures that makes larger pieces smaller (lump reduction). As used herein, such processes and structures may involve one or more of s, chopping, cutting, mashing, fragmenting, squeezing, turning, rolling, or any other structure/process that accomplishes size reduction. Thus, delumping, as used herein, does not necessarily imply an absence of lumps, but rather that at least some large lumps are made smaller using a lump reducer.

Figure 7:
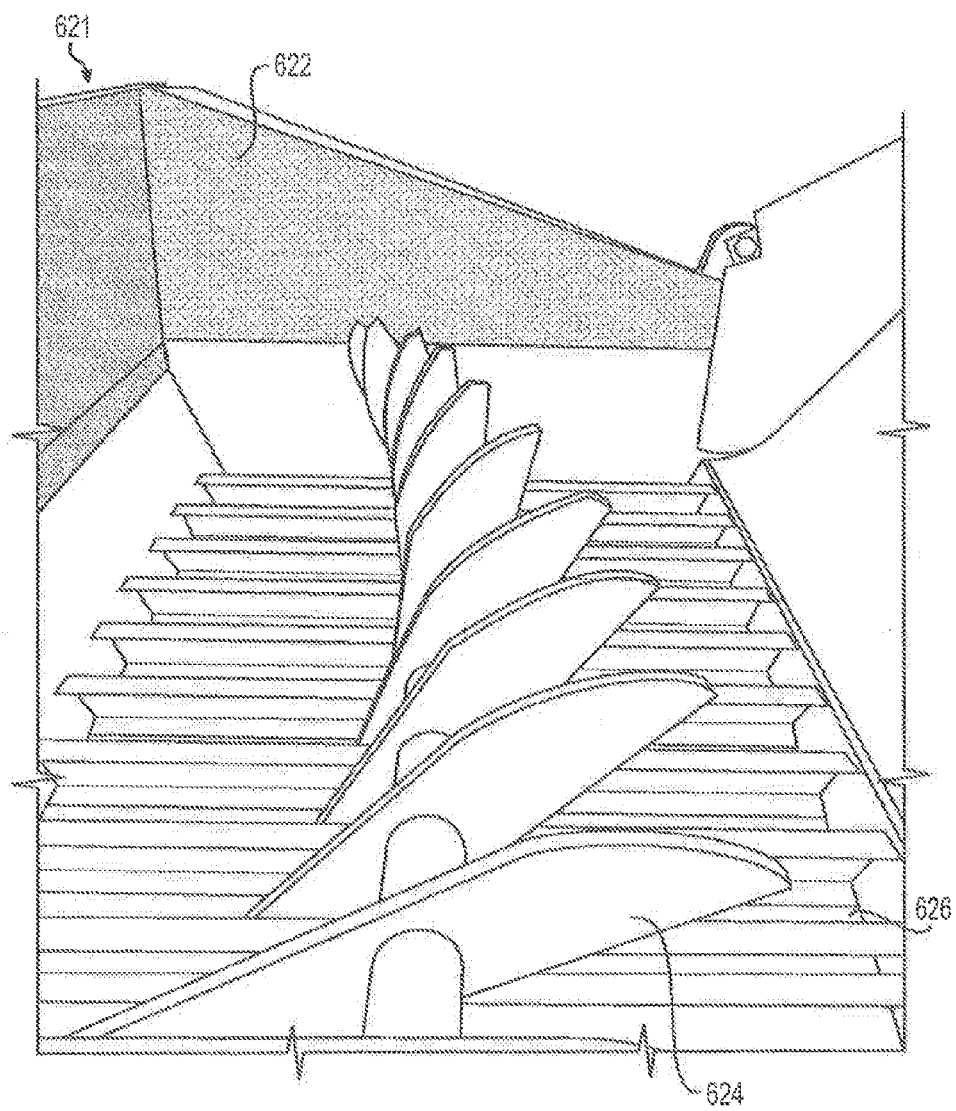
FIG. 7 is a perspective view of a hopper of a conveyor apparatus, according to embodiments of the present disclosure.

The at least one hopper 620, 621 may be located on either end of conveyor 610, and may be configured to receive and break apart solid waste. An exemplary hopper 621 is shown in FIG. 7. As shown in FIG. 7, hopper 621 may include a bin 622 and a plurality of blades 624 positioned within bin 622. It will be understood that blades 624 may have any construction or arrangement. The plurality of blades 624 may be used for delumping the solid waste. For example, as blades 624 turn, they may be configured to chop and/or shred the solid waste located within bin 622 so that the solid waste may be small enough to pass through openings 626 formed in a bottom of bin 622. In some embodiments, the plurality of blades 624 may be configured to fragment the solid waste to form a plurality of clumps weighing less than, for example, 20 lbs.

Referring back to FIG. 6, in some embodiments, hopper 621 may be located at an end of conveyor 610 positioned adjacent expanded opening 30. In this embodiment, the excavated solid waste may be inserted into hopper 621, delumped, and placed on conveyor 610 via openings 626 to be conveyed to mobile tank 630. In additional and/or alternative embodiments, the at least one hopper 620 may be located above manhole opening 632. In this embodiment, waste material may be conveyed to bin 622 of hopper 620, delumped, and then dropped through openings 626 into mobile tank 630. In some embodiments, the fragmented waste material may be dropped into a funnel for conveying the material to an individual compartment of mobile tank 630. Blades 624 may be contained in one or both hoppers. Alternatively, delumping may occur at an intermediate location prior to loading onto the conveyor system.

Mobile tank 630 may be configured to transport the delumped waste to a burning facility. In some embodiments, the delumped waste may be transported in a solid form. At the burning facility, diluents may be pumped into mobile tank 630 and blended with the delumped waste to form a pumpable mixture. The mixture may then be pumped out of one or more outlet openings on mobile tank 630. In other embodiments, the diluent may be added near the refinery tank site.

In order to introduce diluents into mobile tank 630, a head space may be left between a top level of the delumped solid waste in mobile tank 630 and a top wall of mobile tank 630. In some embodiments, mobile tank 630 may be sized to contain at least 20,000 pounds of the solids refinery waste, while maintaining a head space for at least 3,000 pounds of diluent. In those embodiments, the head space may be larger than 12 inches. In other embodiments, mobile tank 630 may be configured to contain at least 50,000 pounds of the solid refinery waste.

In some embodiments, mobile tank 630 may be a pneumatic trailer. As used herein and throughout the disclosure, the term "pneumatic trailer" may refer to any vehicle having a tank with sections that are either partially or completely separated from each other. For example, mobile tank 630 may be similar to those used for example, to transport grains like wheat and oats, powders like cement, and liquids like milk or alcohol. These pneumatic tankers may have three un-separated compartments, which may enable materials to go from one compartment to another compartment.

Figure 8:
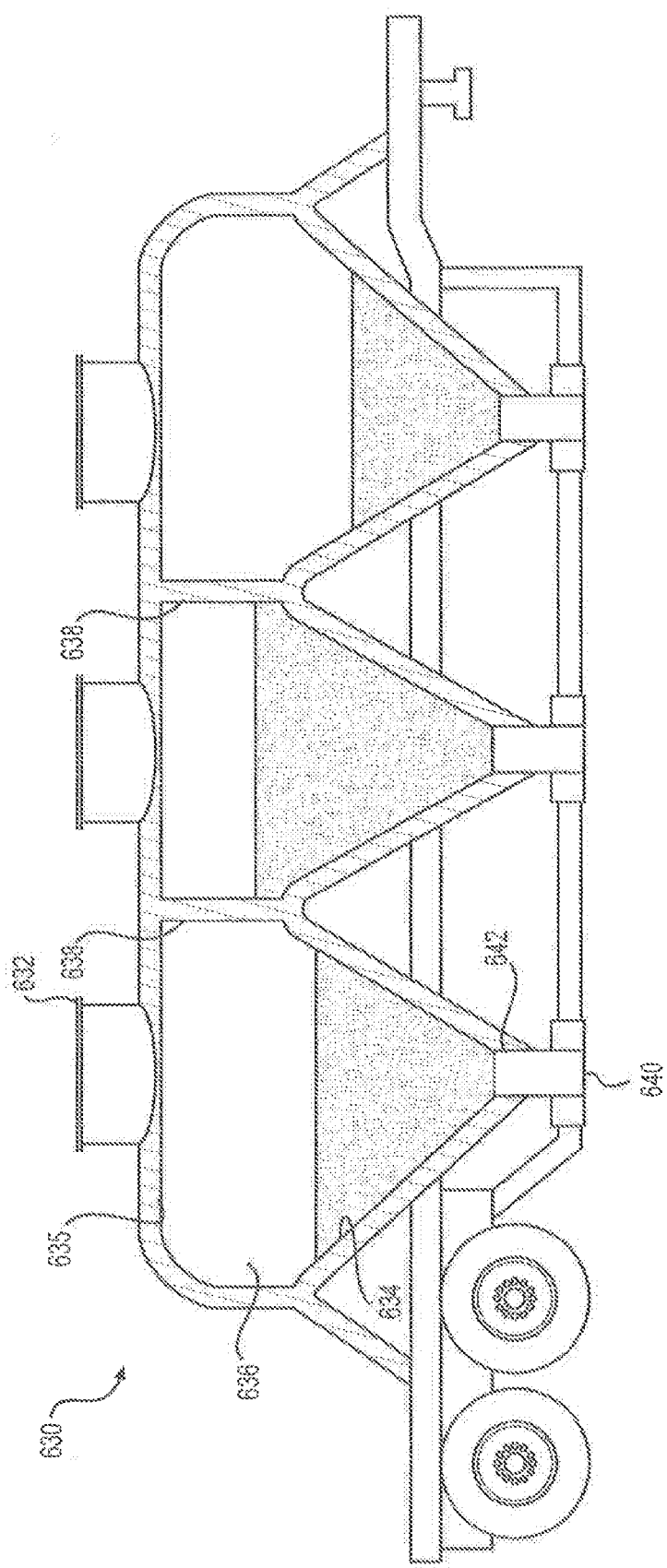
FIG. 8 is a cross-sectional side view of a modified pneumatic trailer, according to embodiments of the present disclosure.

In the present disclosure, mobile tank 630 may be a modified pneumatic trailer as shown in FIG. 8. In particular, mobile tank 630 may have at least two compartments 636 separated by a buffer 638. Buffer 638 may be, for example, a vertical wall extending from a bottom wall of the tank to substantially a top wall 635 of the tank to limit the migration of solid waste between compartments when, for example, at least one diluent is added to one of the plurality of compartments. In the exemplary embodiment shown in FIG. 8, mobile tank 630 may include three compartments 636 separated by two buffers 638. It will be understood that a greater or lesser number of buffers and compartments may be provided.

Figure 9:
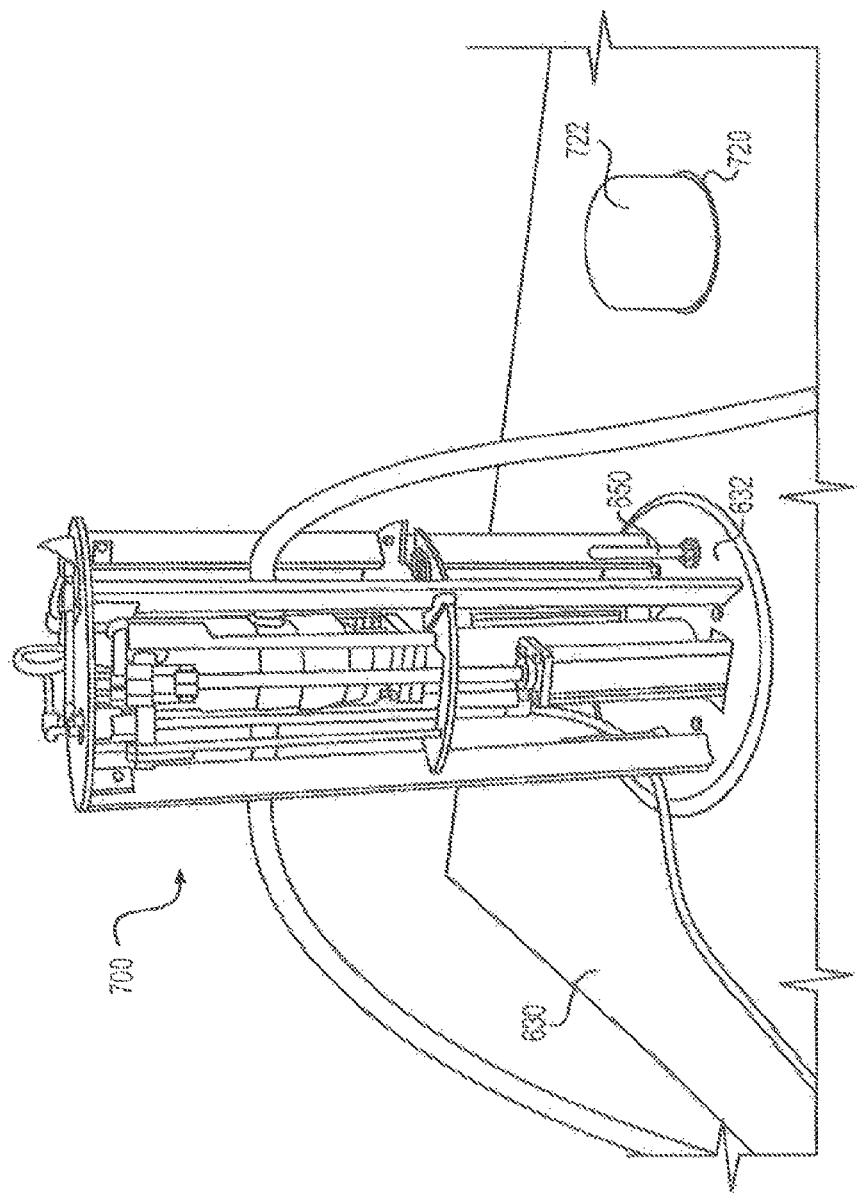
FIG. 9 is perspective view of a mixer, according to embodiments of the present disclosure.

Each compartment 636 may be in fluid communication with a manhole opening 632, a fluid valve 640, and an outlet opening 642. Each manhole opening 632 may be associated with one of the plurality of compartments 636 and sized to enable an agitator or other type of mixer associated with a mixing apparatus 700 (FIG. 9) to pass therethrough. Each compartment 636 may have at least one sloped floor wall 634 (FIG. 8) for enabling the mixed solid refinery waste to migrate by gravity toward outlet opening 642 in a bottom of each compartment 636. A fluid valve 640 may be associated with each outlet opening 642. Each fluid valve 640 may be sized to permit an emulsion of the solid refinery waste and at least one diluent to pass therethrough in flowable form. Fluid valves 640 may be ball valves or double valves designed for liquids. In particular, fluid valves 640 may be configured to off-load tank contents with the assistance of at least one pump. In one example, fluid valves 640 may be ball valves having a diameter of four inches.

Mixing apparatus 700 (FIG. 9) may be configured for mixing refinery solid waste in a mobile tank having at least one compartment with sloped floor walls, such as, for example, mobile tank 630. Mixing apparatus 700 may be any known type of mixer including, for example, an agitator having an elongated shaft and at least one blade connected to the shaft configured to mix the tank contents when the shaft is rotated.

Mixing apparatus 700 may include at least one actuator operable for lifting and lowering at least a portion of the agitator in mobile tank 630 to enable blending of solids and liquid constituents in mobile tank 630. The upward and downward motion of mixing apparatus 700 may enable mixing apparatus 700 to remove refinery solid waste from pockets on the side of the conically shaped compartments 636 of mobile tank 630. The one or more actuators may be, for example, air-actuated cylinders or hydraulic-actuated cylinders to actuate the mixing apparatus up and down to mix the refinery solid waste.

In some embodiments, at least one external support may be configured for disposition adjacent a manhole opening 632 in a top of mobile tank 630. The support may be any know support for supporting the agitator of mixing apparatus 700 when mixing the refinery solid waste in mobile tank 630. In one example, manhole openings 632 may be modified to receive one or more connectors 650 to fasten, bolt, or otherwise lock mixing apparatus 700 to mobile tank 630 during the mixing process. In this manner, hazardous gas may be prevented from escaping mobile tank 630. In some additional embodiments, connectors 650 may be constructed for connection to mixing apparatus 700 in a manner permitting mixing apparatus 700 to be controllably lowered into mobile tank 630 while mixing tank contents. In the exemplary embodiment of FIG. 9, one connector is shown. It will be understood, however, that a greater number of connectors may be provided.

In some additional embodiments, mobile tank 630 may include an opening 720. Opening 720 may be configured form a fluid seal with a fluid pressure system (not shown). The fluid pressure system may be configured to maintain a pressure inside tank lower than a pressure outside tank. Additionally, the fluid pressure system may be configured to evacuate gas from the tank when a diluent is added to the tank. In additional and/or alternative embodiments, opening 720 may also be used to sample tank contents to determine when a homogenous mixture has been formed that may be pumped to the burning facility.

Figure 10:
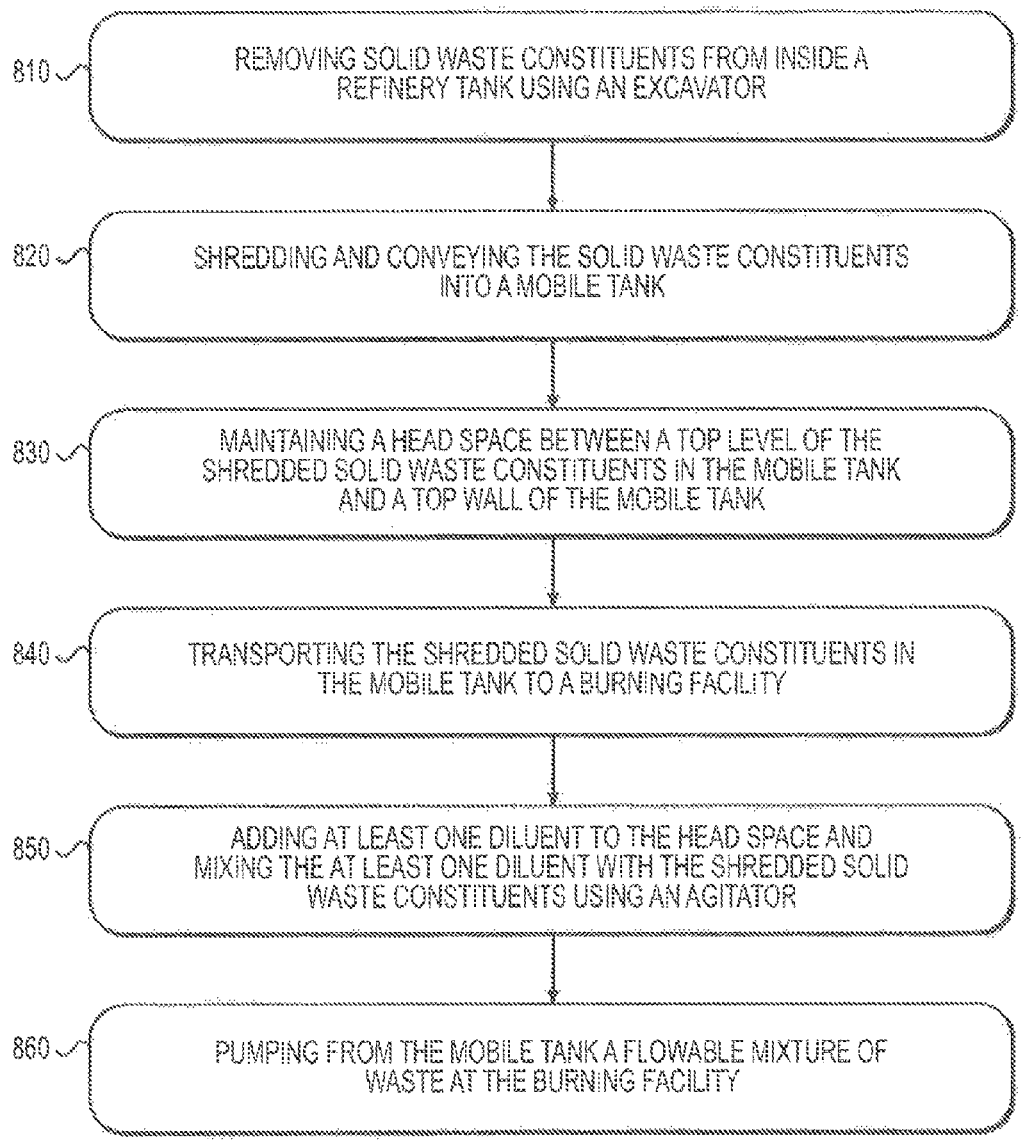
FIG. 10 is a flow chart of a method of disposing of solid refinery waste, according to embodiments of the present disclosure.

Referring to FIG. 10, a method for disposing of solid refinery waste will now be discussed. As shown in FIG. 10, a first step of the method includes removing solid waste constituents from inside refinery tank 10 using excavation machinery such as, for example, an excavator (step 810). This step may be performed in accordance with the methods described above or any other method known to one of ordinary skill in the art.

In some embodiments, the excavated solid waste may be delumped and conveyed into a mobile tank 630 (step 820). The delumping and the conveying may be performed by a single apparatus or separate apparatuses. In one embodiment, a conveying apparatus 600 may be provided with a bin 621 for receiving the excavated solid waste and feeding the solid waste to a delumping device (e.g., blades 624). The delumping device may deposit the delumped solids on a conveyor 610, which may be arranged to deposit the delumped waste into a manhole opening 632 on mobile tank 630. In another embodiment, the excavated materials may be placed onto conveyor 610, which may then convey the materials to bin 622 located above or within manhole opening 632. Other methods of delumping and/or conveying the waste is contemplated.

The delumped waste may be loaded into a compartment 636 within mobile tank 630. Mobile tank 630 may include a single compartment or two or more compartments 636. In those embodiments, a funnel may be provided to convey the delumped material to an individual compartment 636. Each compartment 636 may be partially filled or completely filled. For example, in some embodiments a head space may be left between a top level of the delumped solid waste and a top wall 635 of mobile tank 630 (step 830). The head space may be, for example, larger than 12 inches.

At least one diluent may be added to the head space (step 850). Examples of diluents may include, but is not limited to, water, naphtha, condensate, kerosene, and/or any other diluent known to one of ordinary skill in the art. In some embodiments, the diluent may be added after transporting the delumped solid waste to a burning facility (step 840). In those embodiments, the diluent may be mixed with the delumped waste at the burning facility using a mixing apparatus. In other embodiments, the diluent may be added before transporting the delumped solid waste to a burning facility, and at least partially mixed during transportation.

The mixing apparatus may be any known apparatus including a mixer including, for example, an agitator for mixing the solid refinery waste. In some embodiments, the mixing apparatus may be configured for insertion into at least one manhole opening 632 to mix tank contents. In other contemplated embodiments, each compartment 636 of mobile tank may include a mixing apparatus built in for mixing tank contents during transportation.

In an exemplary embodiment, a mixing apparatus 700 may be inserted into manhole opening 632 and bolted to manhole opening 632 via one or more connectors 650. During the mixing process, mixing apparatus 700 may be configured to agitate the tank contents, including the solid refinery waste. In some embodiments, agitating may include moving at least a portion of the mixing apparatus 700 vertically within mobile tank 630. In some additional and/or alternative embodiments, agitating may include agitating a central portion of an individual compartment 636 to cause the mixture to flow down sloped floor walls towards fluid valve 640. The homogenous mixture may then be pumped from mobile tank 630 through outlet opening 642 (step 860).

In some embodiments, the mixing and pumping may occur in an individual compartment 636 before unloading an adjacent compartment 636. In these embodiments, a single mixing apparatus 700 may be used to agitate a first compartment 636 to form a homogenous mixture. After the homogenous mixture has been emptied from the compartment, the mixer 700 may be inserted into a manhole opening associated with a second compartment for mixing. In other embodiments, multiple mixing apparatuses 700 may be provided so that the mixing and pumping from the compartment 636 may occur simultaneously.

In some embodiments, the mixing and the pumping may occur sequentially. In those embodiments, the mixture may be sampled via opening 720 during the mixing process to determine a mixing resistance of mixer 700. The mixture may be off-loaded from tank 630 only after a predetermined mixing resistance is achieved. The predetermined mixing resistance may correspond to a resistance when the mixture is substantially homogenous and flowable. Additionally and/or alternatively, a pressure control system may be coupled to mobile tank 630 during the mixing and pumping process. The pressure control system may be configured to maintain a pressure inside the mobile tank lower than a pressure outside the mobile tank. The pressure system may be further configured to evacuate gas from mobile tank 630 when the diluent is added to achieve a desired fluid pressure. In some embodiments, the mixture may be off-loaded from tank 630 only after a stable fluid pressure has been achieved. The stable fluid pressure may indicate, for example, that the solids and diluents are mixed and the mixture is ready to be pumped. In other embodiments, the mixing and the pumping may occur simultaneously.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for removing waste from a refinery ground tank and disposing of the waste through burning, the method comprising:
    at a refinery, receiving in a mobile container a load of solid refinery waste removed from a ground tank, wherein after removal of the solids refinery waste from the ground tank, and before receipt in the mobile container, sizes of removed solids are reduced by at least one of chopping, cutting, mashing, fragmenting, squeezing, turning, and rolling;
    transporting the reduced size solids in the mobile container to a burning facility at which at least one diluent added to a head space between a top of the load of reduced-size solids and a top of the mobile container is mixed with the reduced-size solids to cause a flowable mixture of the at least one diluent and the reduced-size solids in the container; and
    evacuating the flowable mixture from the container for burning at the burning facility;
    wherein the container is a road-worthy vessel configured to transport liquids; and
    wherein the reduction of sizes of removed solids is accomplished using at least one blade associated with a hopper and a conveyor for conveying the reduced-size solid waste to the road-worthy vessel configured to transport liquids.

2. The method of claim 1, wherein removal of the solids refinery waste from the ground tank includes using excavating machinery.

3. The method of claim 1, wherein the at least one diluent is added to the head space after the reduced size solids are transported to the burning facility.

4. The method of claim 1, wherein the at least one diluent is added to the head space before transporting the reduced size solids to the burning facility, and mixing the at least one diluent with the reduced size solids takes place, at least partially, during transporting the reduced size solids to the burning facility.

5. The method of claim 1, wherein reducing the sizes of removed solids includes forming a plurality of clumps weighing less than 20 lb.

6. The method of claim 1, wherein the head space between the top of the load of reduced-size solids and the top of the mobile container is larger than 12 inches.

7. The method of claim 1, wherein the mobile container is a pneumatic trailer that includes a plurality of individual compartments, each compartment having a fluid valve at a bottom, each fluid valve being sized to permit a mixture of reduced size solids and the at least one diluent to pass therethrough, and wherein the mixing of the at least one diluent and the reduced-size solids includes agitating the at least one diluent and the reduced size solids using an agitator inserted through a manhole opening on top of the pneumatic trailer.

8. The method of claim 7, wherein the mixing of the at least one diluent and the reduced-size solids includes agitating a central portion of an individual compartment to cause solids to flow by gravity down sloped floor walls of the pneumatic trailer.

9. The method of claim 7, further comprising separately mixing the at least one diluent and the reduced size solids in each of the plurality of individual compartments.

10. The method of claim 7, wherein the agitator is configured for selective insertion into the manhole opening on top of the pneumatic trailer.

11. The method of claim 7, wherein the agitating the at least one diluent and the reduced size solids includes, during the mixing of the at least one diluent and the reduced-size solids, moving at least a portion of the agitator vertically within the pneumatic trailer.

12. The method of claim 1, further including a funnel configured for association with the conveyor, for directing the reduced size solids from the conveyor through a manhole opening on top of the mobile container.

13. The method of claim 1, wherein the mobile container is a pneumatic trailer that includes a plurality of individual compartments separated by at least one buffer, and wherein the mobile container includes a fluid valve at a bottom of each of the plurality of individual compartments, each fluid valve being sized to permit an emulsion of solids and the at least one diluent to pass therethrough in flowable form.

14. The method of claim 13, wherein the plurality of individual compartments includes at least a first compartment and at least a second compartment, and wherein, mixing includes separately agitating each compartment.

15. A method for removing waste from a refinery ground tank and disposing of the waste through burning, the method comprising;

at a refinery, receiving in a mobile container a load of solid refinery waste removed from a ground tank, wherein after removal of the solids refinery waste from the ground tank, and before receipt in the mobile container, sizes of removed solids are reduced by at least one of chopping, cutting, mashing, fragmenting, squeezing, turning, and rolling;

transporting the reduced size solids in the mobile container to a burning facility at which at least one diluent added to a head space between a top of the load of reduced-size solids and a top of the mobile container is mixed with the reduced-size solids using an agitator to cause a flowable mixture of the at least one diluent and the reduced-size solids in the container;

evacuating the flowable mixture from the container for burning at the burning facility; and measuring a mixing resistance of the agitator and initiating evacuation of the flowable mixture only after a predetermined mixing resistance is achieved.

16. The method of claim 15, wherein the predetermined mixing resistance corresponds to when the mixture is substantially homogeneous and flowable.

* * * * *

UNITED STATES PATENT AND TRADEMARK OFFICE
CERTIFICATE OF CORRECTION

PATENT NO. : 9,557,056 B2  
APPLICATION NO. : 14/966024  
DATED : January 31, 2017  
INVENTOR(S) : Robert M. Rumph Page 1 of 1

It is certified that error appears in the above-identified patent and that said Letters Patent is hereby corrected as shown below:

In the Claims

Claim 15, Column 19, Line 25:
comprising; should read --comprising:--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*